April 4, 1961   H. MILLIKEN   2,977,759
CONTINUOUS EXTERNAL COMBUSTION ENGINES
Filed March 20, 1958   7 Sheets-Sheet 1

INVENTOR
HUMPHREYS MILLIKEN
By Fetherstonhaugh & Co.
ATTORNEYS

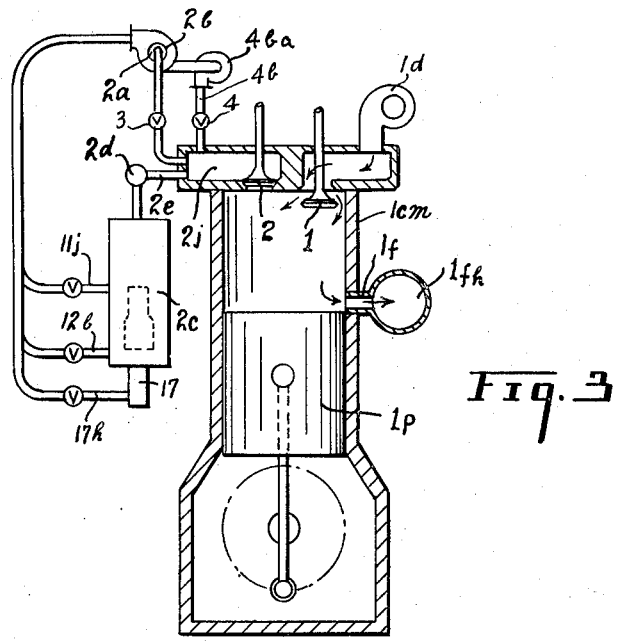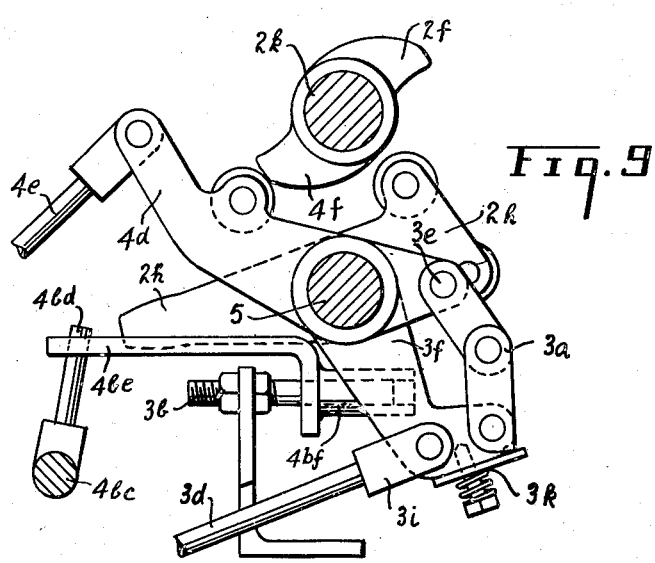

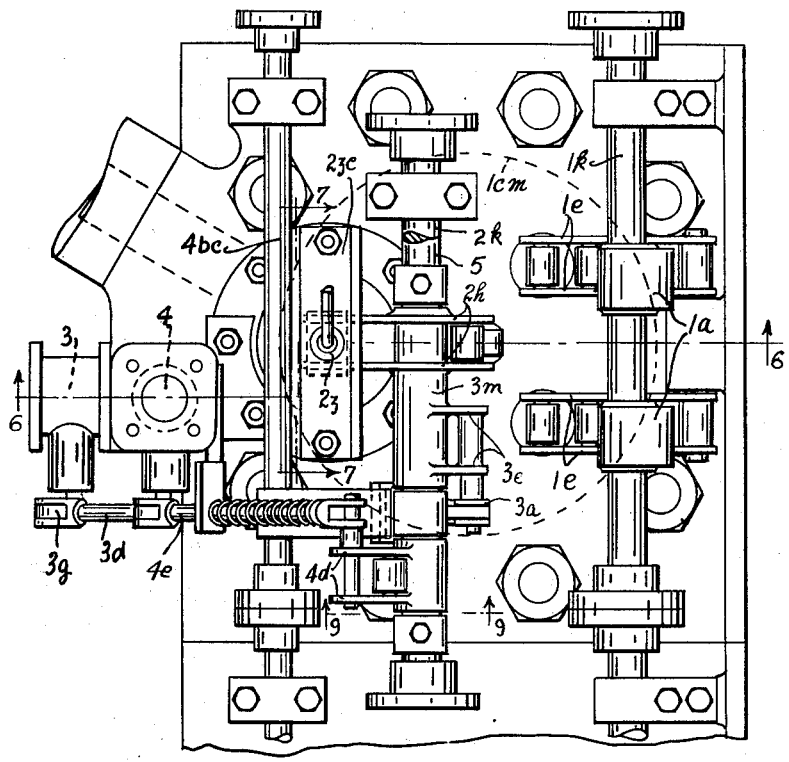
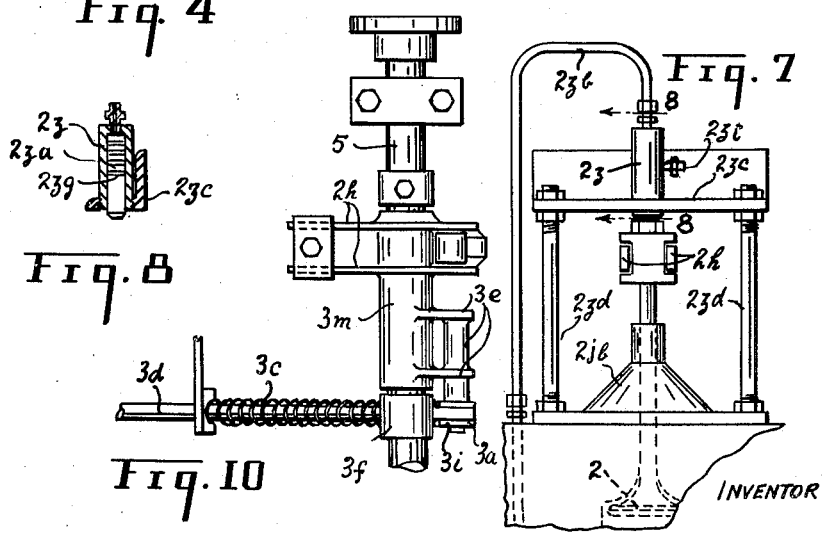

April 4, 1961  H. MILLIKEN  2,977,759
CONTINUOUS EXTERNAL COMBUSTION ENGINES
Filed March 20, 1958  7 Sheets-Sheet 4

INVENTOR
HUMPHREYS MILLIKEN
BY Fetherstonhaugh & Co.
ATTORNEYS

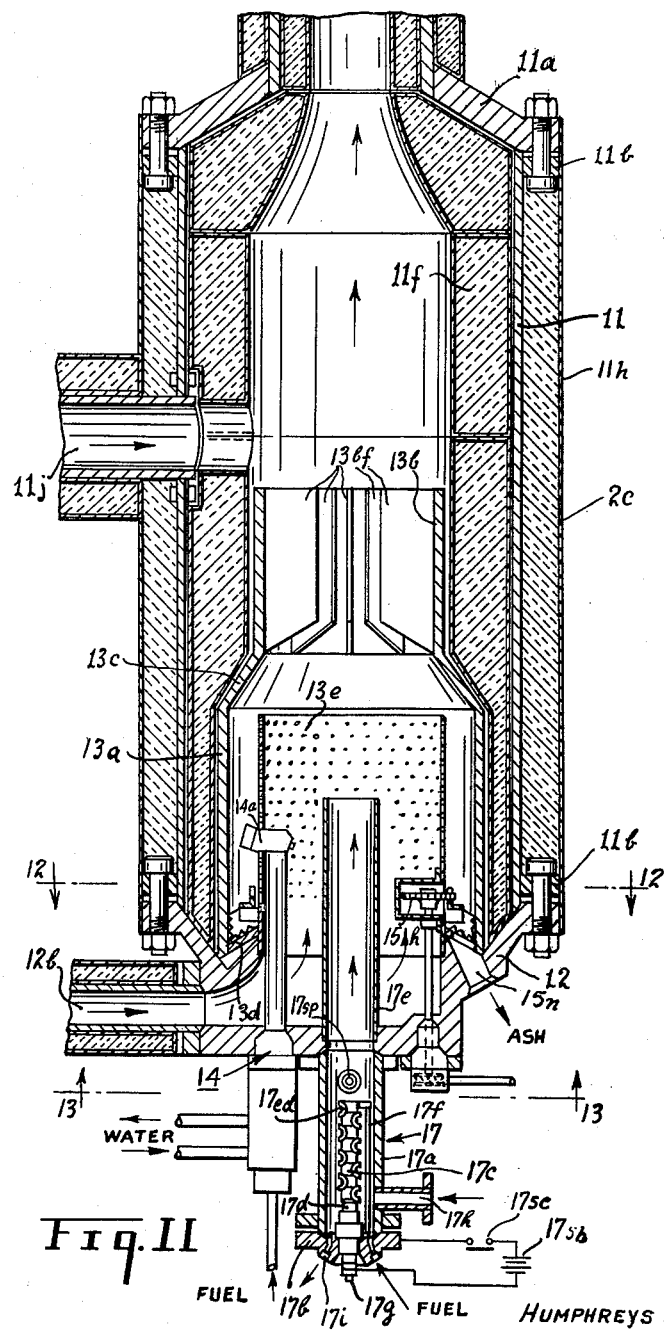

April 4, 1961 H. MILLIKEN 2,977,759
CONTINUOUS EXTERNAL COMBUSTION ENGINES
Filed March 20, 1958 7 Sheets-Sheet 6
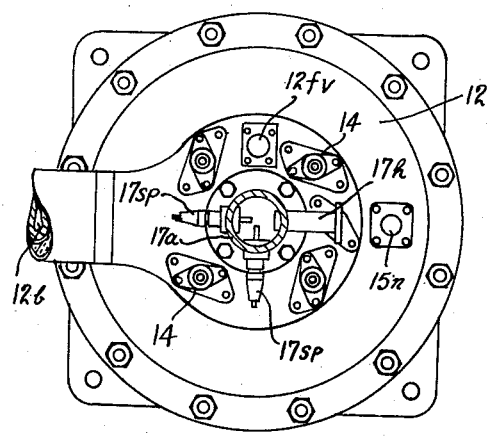
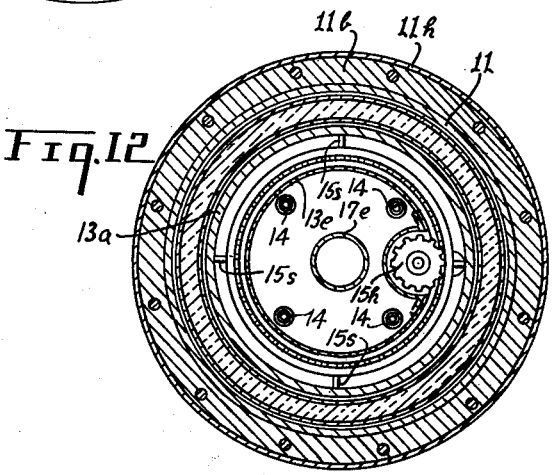
INVENTOR
HUMPHREYS MILLIKEN
BY Fetherstonhaugh & Co.
ATTORNEYS

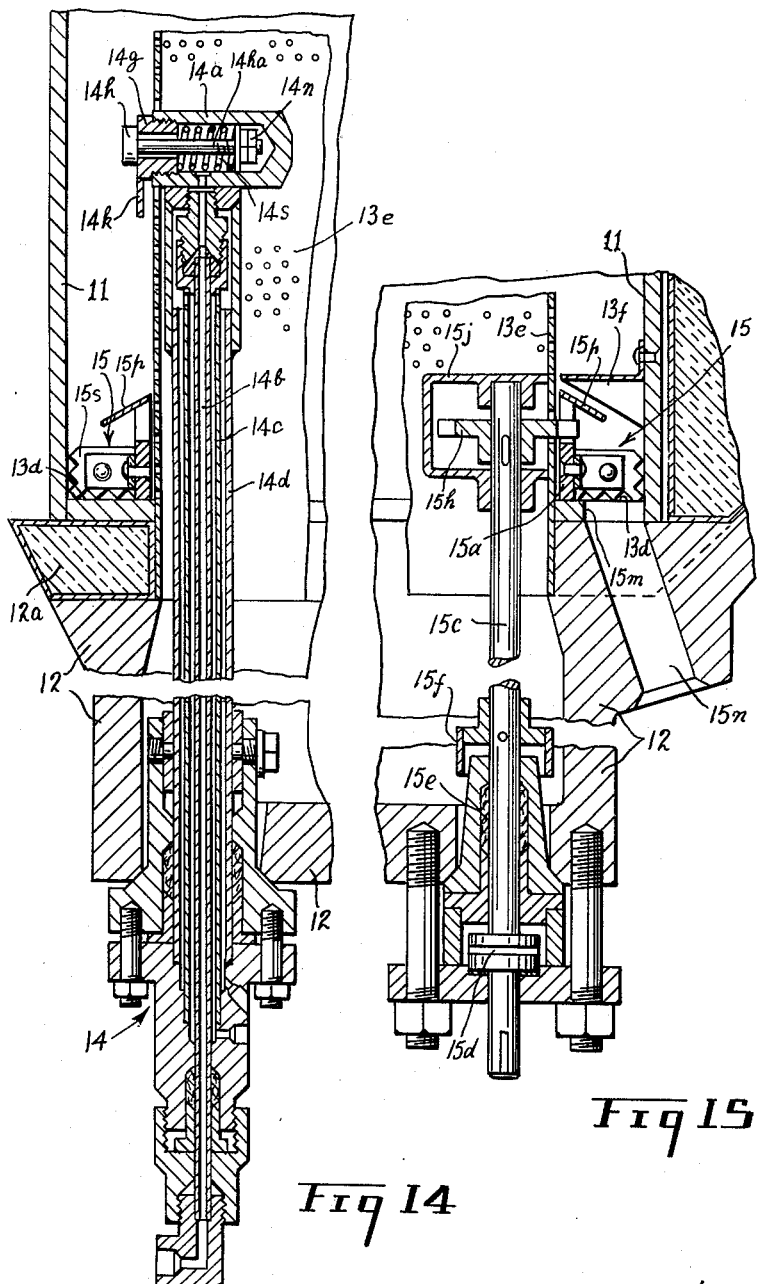

United States Patent Office 2,977,759
Patented Apr. 4, 1961

2,977,759
CONTINUOUS EXTERNAL COMBUSTION ENGINES
Humphreys Milliken, 211 Stampstead Ave., Mount Royal, Quebec, Canada
Filed Mar. 20, 1958, Ser. No. 722,701
14 Claims. (Cl. 60—39.63)

This invention relates to continuous external combustion engines. Its purpose is to provide valvegear with improved features, improvement in the principle of the external combustor permitting operation of the engine with fuel oil of the lowest grade and price, to provide means of conducting the heated compressed air from the engine to the combustor and the combustion products from the combustor into the engine with a minimum loss of heat energy, and other improvements as set forth in the specification.

The invention hereinafter described embodies improvements over the construction disclosed in my United States Patent No. 2,688,230, granted September 7, 1954, and my copending United States application Serial No. 612,212, now abandoned.

In its preferred form the engine operates on a "two-stroke cycle," each cylinder with its piston and valvegear performing one cycle per revolution of the engine. In order to simplify the descriptive specifications, the following assumptions are made: (A) that the centerlines of all of the cylinders lie in the same geometric plane which is vertical; (B) that each cylinder has one piston operating with reciprocating motion therein; (C) that each piston has a connecting-rod connecting the piston to a crank on a crankshaft which is connected to all of the pistons; (D) that the cylinders and pistons are located above the crankshaft. It is understood, however, that the invention is not restricted to the foregoing assumptions, but that the invention is applicable to engines of other types and arrangement of parts, including the following: A, engines in which the centerlines of the cylinders are horizontal or inclined at an angle between horizontal and vertical, such as so-called V type engines; B, engines having opposed pistons and two crankshafts.

The object of the invention is to provide a continuous external combustion engine in which the compressed air supplied by the engine to the external combustor is uncontaminated by the products of combustion received by the engine from the external combustor.

A further object of the invention is to provide a continuous external combustion engine adapted to deliver fresh compressed air to its external combustor which is adapted to efficiently burn low grade fuel oil containing incombustible solid constituents, with means for excluding said solids from the cylinders of said engine.

These and other objects of the invention will be apparent from the following specification and the accompanying drawings, in which:

Figure 3 is a cross section through one cylinder of the engine with the external combustor and accessories shown in diagrammatic form, as in Figure 1.

Figure 4 is a plan view of one of the cylinder-heads using the valve arrangement shown in Figure 1.

Figure 7 is a vertical elevation on the line 7—7 of Figure 4, showing a pneumatic device for counter-balancing the outward thrust on the valvestem.

Figure 8 is a cross section on the line 8—8 of Figure 7.

Figure 9 is a cross sectional elevation on the line 9—9 of Figure 4 showing a portion of the valvegear in the tripped position and to a larger scale.

Figure 10 is a plan view of a portion of the valvegear shown in Figure 9 but to the same scale as Figure 4.

Figure 11 is a vertical sectional elevation on the axis of the external combustor showing the air inlets from the engine and other details.

Figure 12 is a horizontal cross section on the line 12—12 of Figure 11.

Figure 13 is a bottom plan view, looking upward, of the external combustor taken on the line 13—13 of Figure 11.

Figure 14 is an enlarged vertical section of a portion of the combustor shown in Figure 11 and showing in modified form one of the fuel injectors and the ash scraper.

Figure 15 is an enlarged vertical section of a portion of the combustor shown in Figure 11 and showing in greater detail the ash scraper in a modified form together with the ash scraper driving mechanism and ash discharge pipe.

Figure 1:
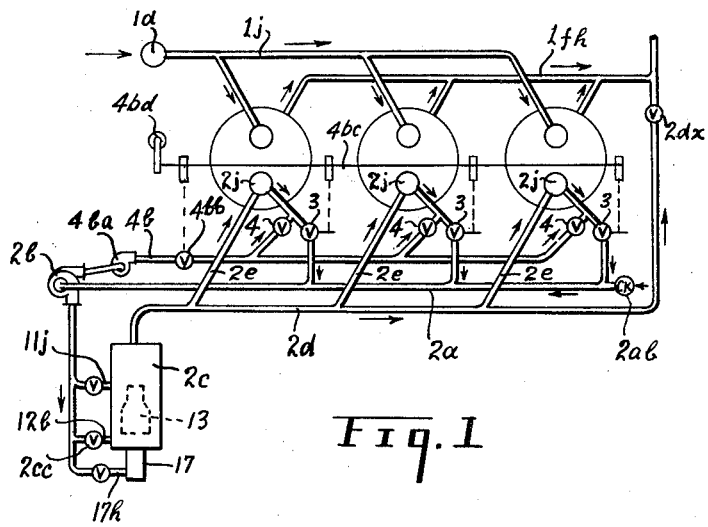
Figure 1 is a schematic diagram of the engine having a plurality of cylinders served by one external combustor and showing the piping, blowers and valves controlling the flow of compressed air from the engine to the combustor and the flow of the combustion products from the combustor to the engine.

The preferred general arrangement and principle of the engine and its accessories, are those shown in Figure 1. The structures shown in Figures 3 to 15 refer to Figure 1.

Referring to Figure 1 and Figure 3 the general principle of the engine is as follows: In Figure 3 the piston 1p is shown in the position it occupies just after the completion of its power stroke, which is downward. The piston 1p has just uncovered the exhaust ports 1f through the wall of the cylinder 1cm and the combustion products, having expanded with reducing pressure, to a relatively low value, blow through the exhaust ports 1f to atmosphere through the exhaust header 1fh; the pressure of the residual products in the cylinder has dropped to practically atmospheric pressure. Valve 1 has just opened admitting cold fresh air at approximately 4 lbs. pressure into the cylinder, scavenging out the residual combustion products, leaving the cylinder 1cl filled with cold fresh air. As the piston 1p recloses the exhaust ports 1f in its upward stroke, the pressure of the cold fresh air in the cylinder is slightly above atmospheric; then valve 1 closes and the piston starts compressing the air, valves 1 and 2 being closed. When the pressure in the cylinder 1cm slightly exceeds that in the valve chamber 2j, on the top side of valve 2, the valve 2 is opened by the pressure and the piston pushes all of the compressed air out of the cylinder, there being no clearance volume as in an internal combustion engine. The compressed air flows through valve-chamber 2j into header 2a, drawn by the circulating blower 2b which circulates the compressed air through the combustor 2c in which its absolute temperature and volume are approximately doubled by the combustion of fuel. The increased volume of compressed air is returned through header 2d and inlets 2e to the valve chambers 2j into the cylinders, driving the pistons down on their power strokes. In each cylinder, valve 2, as it is opened by air pressure is also opened further and held open in full open position by its cam 2f, while the piston and its crank pass through top-dead-center position. Valve 2 is held open admitting the combustion products into the cylinder, driving the piston downward in its power stroke. The admission period is ended by the closing of valve 2 by its spring 2g and rocker 2h after the piston has traveled approximately ten percent of its power stroke. After the admission period is cut off by closing of valve 2, the power stroke continues by the combustion products expanding with reducing pressure until the exhaust ports 1f are uncovered by the piston and the combustion products at low pressure exhaust into the exhaust header 1fh, thus completing the cycle of operation.

The function of valves 3 and 4 is to completely prevent the mixing of the combustion products ($CO_2$ and $H_2O$) with the fresh compressed air which the engine pumps into header 2a, thence into the burner in the combustor which contamination would interfere with efficient combustion of the fuel. Valve 3 remains closed until valve 2 begins opening and the piston starts pushing the compressed air out of the cylinder; then valve 3 opens permitting flow of the compressed air into the header 2a. When the piston is very close to top-dead-center and the flow of compressed air out of the cylinder practically ceases, valve 3 closes, preventing combustion products from being drawn into the compressed air header 2a through valve chamber 2j from combustion products header 2d.

Blower 4ba draws compressed air from blower 2b blowing it into header 4b at a pressure about 2 pounds higher than the pressure in header 2d. When valve 2 closes ending the flow of combustion products into the cylinder, valve chamber 2j is left filled with combustion products. When valve 2 closes, valve 4 opens admitting a momentary flow of fresh compressed air from header 4b through valve chamber 2j purging the residual combustion products out of the valve chamber 2j, pushing it back into inlet 2e. Valve 4 recloses before valve 2 opens again in its next compression stroke.

Referring to Figures 4 to 10 showing the valvegear, there are two camshafts 1k and 2k driven by spur gears as shown. The three gears shown have helical teeth. Each of the two camshafts 1k and 2k is adjustable longitudinally while running, thereby permitting adjustment of the timing of the valvegear in relation to the engine crankshaft and pistons. Such adjustment facilitates tuning of the valvegear for best performance. The two camshafts 1k and 2k are driven by a spurgear 1kd as shown, which in turn, is driven from the engine crankshaft by any suitable mechanical drive, preferably a vertical shaft with bevel gears at each end. As the engine operates on a two-stroke cycle, the camshafts turn at the same speed as the engine crankshaft.

Each cylinder 1cm has two identical air inlet valves 1 opened and closed simultaneously. The two valves are provided in order to insure ample air inlet capacity to thoroughly scavenge the cylinder. Each of the valves 1 is opened by its cam 1a and closed by its spring 1b and rocker 1e. The timing of valve 1 in relation to the piston position is hereinbefore described in reference to Figure 3.

Figure 6:
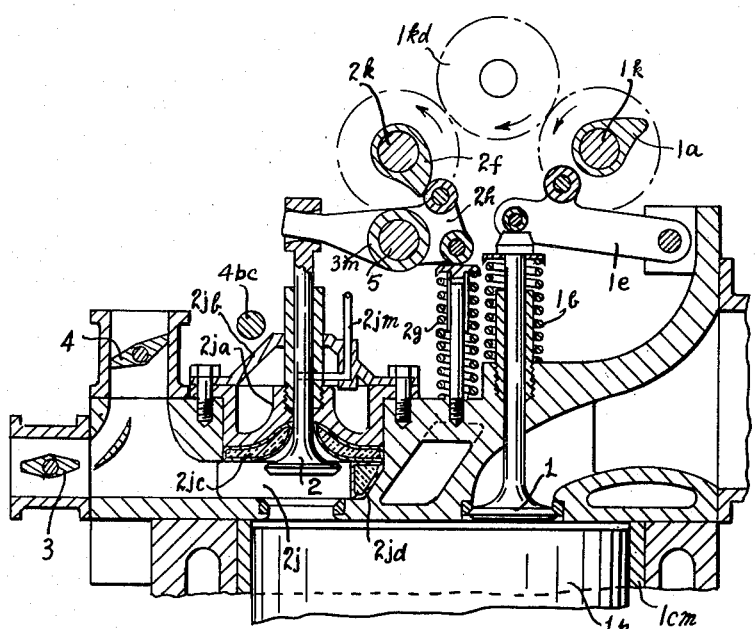
Figure 6 is a vertical cross section of the cylinder head taken on the line 6—6 of Figure 4.

Each cylinder 1cm has one reverse-flow valve 2 opened by its cam 2f and closed by its spring 2g and rocker 2h as shown in Figure 6. Valve 2 is opened outward into its valve chamber 2j. The valve stem moves in a guide secured in the roof 2ja of valve chamber 2j having a conical cover 2jb. The space between 2ja and 2jb is filled with cooling water circulated in and out by conventional means. Lubricating oil is pumped into the valve stem guide through tube 2jm.

Valve chamber 2j is lined with granular heat insulation enclosed in sheet metal containers 2jc under the roof and 2jd around the semicircular side of the chamber. The inner side of the sheet metal containers exposed to the air pressure in the chamber, has perforations closely spaced, to provide free flow of air in and out of the granular heat insulation, to equalize the pressure and avoid stress on the sheet metal. The perforations are smaller in diameter than the smallest granules in the insulation to prevent loss of insulation.

Figure 5:
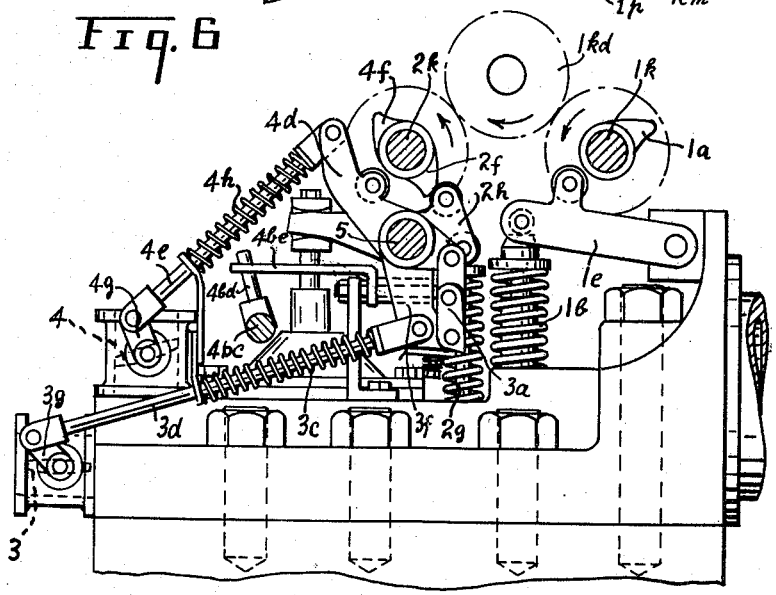
Figure 5 is a vertical end elevation of one cylinder head of the engine corresponding to Figure 4.

The mechanism which opens and closes valve 3 in correct relation to the reverse-flow valve 2, comprises the following parts shown in Figures 4, 5, 9 and 10. Rocker 2h which opens valve 2 is mounted on the stationary rocker shaft 5, the rocker being integrally joined to a sleeve 3m free to rotate about 18 degrees. The sleeve 3m, shown in Figure 10, extends along the shaft 5 and has integrally joined to it a pair of cranks with a pin 3e parallel to shaft 5, Figures 9 and 10. The end of the pin assembly 3e engages the upper end of a toggle 3a, Figures 5 and 9. The lower end of the toggle 3a engages the lower end of a crank 3f, Figures 5, 9 and 10, mounted on the same stationary rocker shaft 5, rotatable through approximately 18 degrees. The lower end of the crank 3f also engages a clevis 3i fastened on the end of rod 3d having a clevis on its other end engaging a crank 3g fast on the stem of valve 3, of butterfly type, rotatable approximately 45 degrees from closed to open position. As shown in Figure 5, a compression spring 3c, concentric around rod 3d, has its left end bearing against a bracket fast to the stationary structure of the cylinder-head. The right hand end of the spring 3c bears against the clevis 3i. Valve 3 is shown in its open position; cam 2f is shown in position holding valve 2 almost full-open; the flow of compressed air out of the cylinder has almost ceased; valve 3 is on the point of being released and reclosed by spring 3c, to prevent combustion products from being drawn from header 2d through valve chamber 2j into header 2a by the suction of blower 2b thence circulated through the burner, which would interfere with efficient combustion by contamination of the fresh compressed air.

As shown in Figure 5, the knee of the toggle 3a has just contacted the right hand end of stationary trip rod 3b; further slight clockwise rotation of the toggle, by the pin assembly 3e, due to further slight rotation of the cam 2f and rocker 2h, will flex the knee of the toggle, releasing the rotative force of the toggle on the crank 3f; the compression spring 3c will then turn the crank 3f approximately 18 degrees counterclockwise, which will flex the toggle to the position shown in Figure 9; the compression spring 3c will push the clevis 3i to the right, pulling on rod 3d, closing valve 3. The toggle 3a will remain in the flexed position shown in Figure 9 until it is straightened again by the counterclockwise rotation of the pin assembly 3e, integral with sleeve 3m and rocker 2h, when released by cam 2f, and valve 2 is closed by spring 2g, ending the admission of combustion products into the cylinder. The toggle being so straightened will be ready for the next re-opening of valve 3, when valve 2 is opened at the end of the next compression stroke of the piston upward, and the next flow of compressed air out of the cylinder begins. When thus straightened, toggle 3a is held straight by spring assembly 3k bearing against flat end of toggle as shown in Figures 5 and 9.

Immediately after the closing of valve 2, ending the admission of combustion products into the cylinder, the opening of valve 4 is started by cam 4f on camshaft 2k, contacting the roller on crank 4d, mounted rotatably on stationary rocker shaft 5, rotating crank 4d counterclockwise, pushing on rod 4e rotating crank 4g fast on valve stem of valve 4, compressing spring 4h, the left end of the spring bearing against the stationary structure of the cylinder head. Valve 4 is held open by its cam 4f, passing fresh compressed air from header 4b, through valve chamber 2j, purging it of combustion products remaining in the valve chamber after valve 2 closes, the combustion products being pushed back into inlet 2e. The profile shape of cam 4f will be such as to release crank 4d permitting spring 4h to reclose valve 4 before valve 2 reopens at the end of the next compression stroke of the piston.

After valve 4 closes, there will be a small volume of fresh compressed air left in inlet 2e; also after valve 3 closes, the valve chamber 2j will be left filled with fresh compressed air; these two small volumes of fresh compressed air will circulate through header 4b without passing through the combustor, but their volume is negligible in comparison with the total volume of compressed air pushed out of the cylinder at each stroke. There is no loss of heat energy involved.

Figures 7 and 8 show a device for counter-balancing the outward thrust on the stem of valve 2 due to the air pressure in valve chamber 2j. With a valve stem of half inch diameter, 0.20 square inch, cross sectional area, and a pressure of 500 p.s.i.g in valve chamber 2j, the outward thrust on the valve stem would be 100 lbs., which would require a force of more than 100 lbs. to be exerted by spring 2g, to reclose the valve when released by cam 2f. Such a large spring force would be too great for practical operation. Hence it is necessary to counterbalance the outward thrust. Figures 7 and 8 show two views of a stationary cylinder 2z of the same diameter as that of the stem of valve 2. Fitting closely in cylinder 2z is a piston 2za with its lower end resting on the top of the valve stem, the piston being concentric with the valve stem but not attached to it. The upper end of cylinder 2z is connected to a tube 2zb which extends down through the cylinder head in communication with the interior of the engine cylinder, thus maintaining an air pressure on top of piston 2za and valve stem of valve 2, equal at all times to the pressure in the cylinder of the engine, only modified by the slight timelag of the air flow in and out of the tube 2zb. Thus, when cam 2f release rocker 2h, spring 2g, of 8 to 10 lbs. force closes valve 2 against no opposing force except that of the inertia of the rocker 2h and valve 2. As valve 2 closes and the pressure in the engine cylinder declines according to the expansion curve, the small volume of compressed air in the small cylinder 2z blows back into the engine cylinder thus returning to the engine piston the same amount of power which was expended in compressing the small quantity of air and pushing it into cylinder 2z. Hence there is no loss of power involved. The cylinder 2z is secured in its position, concentric with the stem of valve 2, by a horizontal beam 2zc fastened at each end to a vertical stud 2zd which also serves as one of the studs which secures the valve stem guide structure 2jb to the cylinder head. The small piston 2za has V-shaped circular grooves 2zg turned in its surface to increase the pneumatic resistance of air-leak. Lubrication is provided as indicated by the tube fitting 2zi through the wall of the small cylinder 2z.

The external combustor 2c shown in Figures 11 to 15 consists of the following members: a pressure vessel which may be designed for an operating pressure of 500 p.s.i.g., comprising a steel pressure cylinder 11, closed at its upper end by a reducing flanged elbow 11a which is connected to the entrance end of the header 2d; a base casting 12, closing the lower end of the pressure vessel. Flanges 11b welded to the cylinder 11 at top and bottom, are bolted to members 11a and 12. The pressure vessel is lined internally with heat insulation 11f, preferably "Vermiculite", a granular mica mineral, enclosed in containers of sheet metal, preferably Inconel, such materials being adapted to operate at red heat with high insulating value and long life. Internal heat insulation is necessary in order to limit the temperature of the pressure cylinder 11 to a temperature which will not reduce its tensile strength below a safe value for the operating pressure. The inner wall of the internal insulation has closely spaced perforations in order to provide for the free flow of the compressed air with combustion products in and out of the granular insulating material, to maintain equal pressure on the two sides of the thin sheet metal as the pressure in the combustor is raised and lowered when the engine is started up and later shut down. The diameter of the perforations is smaller than the smallest granules of insulation in order to prevent loss of insulation.

In order to minimize the loss of heat energy, insulation is also applied to the outer side of the pressure cylinder 11 by a casing 11h of thin sheet metal which may be aluminum, the temperature being only slightly above room temperature. The sheet metal casing fits closely around the top and bottom flanges 11b, the annular space being filled with the granular insulating material.

A compressed air inlet conduit 11j is welded to an opening through the pressure cylinder, for the entry of the secondary compressed air into the combustor, to be heated and approximately doubled in volume by mixing with the flame as it issues from the burner. The compressed air ducts require only external heat insulation as the temperature of the air will not exceed approximately 1000° F.

With heat insulation applied to the external piping and combustor, as hereinbefore described, the total loss of heat energy therefrom amounts to less than one percent of the capacity of the engine, according to values of "k" the coefficient of thermal conductivity established by authentic sources of such technical data.

The main burner assembly 13 as indicated in Figure 1 and shown in detail in Figure 11, comprises the following principal members: a fuel-vaporizing member 13a of cylindrical shape; a flame-heated member 13b having radial fins 13bf which provide additional area of contact with the flame; member 13c of conical shape, integrally joined to 13a and 13b conducts heat from 13b to 13a to maintain vaporizing temperature of 13a. At the lower edge of the vaporizer 13a is an ash ledge 13d integrally joined to 13a. The ash ledge also acts as a fuel vaporizing surface. Members 13a, 13b, 13c and 13d are made of copper plate with the joints copper welded and all surfaces "metallized" by spraying on molten aluminum and molten copper in alternating successive layers then heat treated to form a bronze coating integrally bonded to the copper plate, providing a surface which will not oxidize by repeated heating to redness. Extensive experience has shown that such treatment gives satisfactory service. Copper is used on account of its high heat conductivity. The weight of the burner assembly is supported on the base casting 12 with a ring 12a of heat insulation, as shown in Figure 14.

A vapor screen 13e of thin sheet metal such as Inconel, of cylindrical shape, fits tightly the inner edge of the ash ledge 13d and the base casting 12 as shown. Primary air inlet duct 12b is bolted to an inlet opening in casting 12 as shown; this primary air duct is the one shown in Figure 1 having the control valve 2cc. Fuel oil is fed to the burner by four nozzle assemblies 14 equally spaced around the inside of the cylindrical vapor screen 13e. The actual location of the four nozzle assemblies is shown in Figures 12 and 13. The nozzle assembly shown in Figure 11 is actually located in a vertical plane 45 degrees from the vertical plane shown in Figure 11. Figure 14 shows the nozzle assembly on a larger scale with a portion of the combustor, close to the nozzle assembly; Figure 14 shows the details in preferred form. The nozzle assembly 14 comprises the following members: a nozzle cylinder 14a; a bushing 14g screwed into the end of cylinder 14a; a spray disc 14h bearing against the end surface of the bushing around its entire periphery with an accurate ground fit; the disc 14h has an integral stem 14ha of smaller diameter than the bore through the bushing; the stem is threaded at its end and fitted with a washer and a pair of nuts 14n. Concentric around the stem is a compression spring 14s bearing against the washer and nuts at one end and against the bushing 14g at the other end, thereby exerting a force holding the spray disc 14h tight against the bushing 14g.

The nozzle cylinder 14a has a small fuel inlet through its wall on the lower side, to which is tightly connected by conventional fittings a fuel tube 14b extending vertically downward, concentric with the nozzle assembly, through the bottom of base casting 12, to the exterior of the combustor where it is connected to the fuel supply.

In order to use the fuel oils of the lowest grade and price, such as the fuel known as "Bunker C," it is necessary to provide means for heating the oil to a temperature of approximately 180° F. to 220° F. to reduce its viscosity to a free flowing condition. The oil is heated to that temperature in equipment external to the combustor. When starting the combustor and engine from a cold condition, the fuel tube 14b is preheated before admitting the bunker C oil, in order to avoid chilling the oil in its passage through the tube 14b. Such preheating of tube 14b is accomplished by passing hot water through tube 14c which surrounds tube 14b concentrically. For return of the water a third concentric tube 14d is provided, enclosing the tubes 14c and 14b. The fuel tube 14b has appropriate connections and fitting at its upper and lower ends to prevent leakage of the oil, which must be pumped in at a pressure equal to the operating pressure of the combustor and engine which may be approximately 500 p.s.i.g. plus the pressure required to force the oil out through the spray nozzle.

The outer tube 14d has connections at each end suitable for the pressure of the compressed air in the combustor, approximately 500 p.s.i.g. The lower ends of the water tubes 14c and 14d have packing glands suitable for water pressure which is low. The opening through the bottom of base casting 12 through which the nozzle assembly 14 passes, is made tight against leakage of the compressed air by metal-to-metal fit as shown in Figure 14, the pair of bolts holding the fitting assembly tight against the ground seat in the base casting opening are shown in Figure 13. After the burner has been in operation for a considerable time at full capacity, the heat radiated from the vaporizing surface of 13a will maintain the temperature of fuel tube 14b within the range required for free flowing of the bunker C oil, without the circulation of hot water, which will be automatically stopped. Under some conditions, the temperature of tube 14b may reach a level which would be higher than desirable; under such conditions, the water entering tube 14c would be introduced at a cooling temperature. By such arrangement, the temperature of the bunker C fuel can be controlled within the safe range of operation.

The fuel oil is pumped into the nozzle 14 by a conventional fuel pump of the positive type delivering the oil at a definite controlled rate independently of the opposing back-pressure in the burner and engine, which may be approximately 500 p.s.i.g., plus the resistance offered by the spray disc 14h pressed against the bushing 14g by the spring 14s by a force which depends on the adjustment of the nuts 14n. For example, if the engine governor controlling the fuel pump calls for a fuel flow of fifty pounds of fuel per hour, that rate of flow will pass through the nozzle, the pump pressure will be whatever is required to force the spray disc 14h open against the force of spring 14s, by a sufficient separation from the bushing face, to pass fuel at the rate of fifty pounds per hour. The force which the spring is adjusted to exert will determine, inversely, the thickness of the spray between the disc and the bushing face, the velocity of the spray and the fineness of the so-called "atomization." Oils of all kind, with surface exposed to the atmosphere, absorb a small quantity of air. When pressure is applied to the oil, as by a high pressure pump, there is a compression of the minute quantities of the occluded air which minute air bubbles, though invisible, expand in all directions when the pressure is abruptly released as in issuing from the minute crevice between the spray disc 14h and the bushing face, thus spreading out the flat film of oil into a wide angle, such as 90°, the angle of divergence being proportional to the pressure on the oil. Thus the pattern of the spray of fuel from the circular orifice between the nozzle disc 14h and bushing face 14g, will be hemispherical and distribute the spray of fuel over the entire cylindrical vaporizing surface of member 13a, reaching also portions of the member 13c and ash ledge 13d which are also at vaporizing temperature.

The four fuel nozzles will be operated simultaneously only when the full capacity of the engine is required. For light load and "idling" only one nozzle will be used which will maintain the entire cylindrical surface of member 13a at vaporizing temperature. It will be quite feasible to use light distillate No. 1 fuel oil instead of the heavy bunker C oil when starting the burner and engine from a cold condition, changing automatically to bunker C after the burner has become sufficiently heated. Also it will be feasible to change from bunker C to No. 1 oil just before shutting down the engine and burner for a period during which the burner will become cold, thus leaving the nozzle filled with No. 1 oil instead of bunker C.

With the vaporizing surface 13a at or above vaporizing temperature, all of the combustible constituents of the fuel oil will be vaporized instantly on contacting the hot metal surface. The non-combustible solid constituents, ash, are separated from the vapor and drift down by gravity to the ash ledge 13d, which is also at vaporizing temperature. When operating at maximum capacity of the burner, a small percentage of the liquid fuel spray will reach the surface of the ash ledge 13d and be vaporized. The ash is removed continuously during operation by an ash scraper assembly 15 shown in Figure 11 and in more detail in Figure 15, comprising the following parts: four scraper blades 15s of metal plate, such as Inconel, equally spaced around the ash ledge 13d, each scraper blade being held in vertical position by a pair of angle clips riveted with slack to a circular steel band 15a encircling the outside of screen 13e; the slack attachment of each scraper blade to the band 15a insures that each scraper blade will rest by its own weight on the ash ledge; the assembly of the four blades on the circular band 15a makes a slack fit within the annular space between the cylindrical vaporizing member 13a and the cylindrical screen 13e. Each scraper blade has teeth cut in its lower edge which rests on the ash ledge and on its vertical edge which rubs loosely against the vaporizing member 13a. The slack fit insures against binding of the scraper assembly in its slow rotation, hereinafter described. The upper edge of the circular band 15a has gear teeth cut in its entire periphery, adapted to mesh with and be driven by a spur gear 15h driven by a vertical shaft 15c extending downward through the bottom of base casting 12 to the exterior of the combustor where the shaft is coupled to mechanical means by which it is rotated at a very slow speed such as one revolution per minute, which drives the scraper assembly 15 at approximately one fifth of a revolution per minute. At one point in the ash ledge is a hole 15m of diameter smaller than the width of the ash ledge; this hole is secured in line with a duct 15n extending downward through base casting 12 to the exterior of the combustor to which is connected a pressure vessel adapted to receive and store the ash as it is scraped from the ash ledge and dumped through the hole 15m and duct 15n. The circular band 15a having gear teeth cut in its upper edge, has attached to the tips of the teeth at several points, preferably by welding, a circular oil spray deflector 15p inclined downward away from the screen 13e. Each of the four nozzle bushings 14g has attached to its lower side, preferably by welding, an oil drip member 14k which serves to prevent the trickling of oil downward onto the screen 13e, directing the trickle of oil away from the screen, dropping the oil onto the deflector 15p. The deflector also serves to receive whatever portion of the fuel spray might otherwise fall on the gear teeth and deflect the spray, causing it to drop onto the ash ledge where it will be vaporized. Attached to the vaporizing cylindrical member 13a and located just over the ash discharge opening 15m, is an oil deflector 13f, which serves to deflect liquid fuel from entering the ash discharge opening, deflecting the oil to drip onto the ash ledge where it will be vaporized. Thus only dry ash will enter the ash discharge opening.

The pneumatic downward thrust on the shaft 15c is held by a thrust ball bearing 15d as shown. The upper end of the shaft is held in correct alignment by bearings integral with the gear enclosure 15j fastened to the screen 13e. Packing gland 15e controls leakage of compressed air at the lower end of the shaft. The packing and gland assembly makes a metal-to-metal closure with the ground seat in the bottom of the casting 12, held by two studs as shown. Collar 15f fast to the shaft excludes from the packing any trickle of oil down the shaft.

When starting the burner from a cold condition it is necessary to first preheat the vaporizing member 13a to vaporizing temperature. This is accomplished by the preheater assembly 17 shown in Figure 11, which comprises the following members: a vertical fuel vaporizing chamber 17a concentric with and bolted to a circular opening in the bottom of casting 12. To the lower flanged end of 17a is bolted a blind flange 17b on which is mounted concentrically an electric vaporizing assembly comprising the following members: a fuel inlet tube 17f, joined mechanically and electrically to a pipe-tapped hole through the blind flange 17b as shown, adapted for connection to the fuel supply. The upper end of tube 17f is joined to a fuel distributing tube 17d extending downward concentric to 17a, ending near the blind flange, the lower end of tube 17d being closed. The distributing tube 17d is perforated throughout its length by closely spaced small holes adapted to pass fuel oil. Fuel distributing tube 17d is enclosed by a fuel diffusing assembly 17c comprising a series of rings of porous material, preferably slate, which also acts as an electric insulator. An electric heating element 17ed partly encloses the diffuser assembly throughout its length; the heating element 17ed is preferably composed of Inconel sheet metal sheared into a zig-zag pattern then rolled to an internal diameter slightly larger than the outside diameter of the slate diffuser assembly; Inconel being an alloy composed mainly of nickel and chromium, has a high electric resistivity well adapted for heating service. The heating element is joined electrically at its upper end to the upper end of the fuel inlet tube 17f; the lower end of the heating element is joined electrically to an electric conductor, preferably a copper rod 17g sealed into an electric insulating bushing screwed tight into a tapped hole concentric through the blind flange, the lower external end of the rod 17g being threaded for nuts for connection of an external electric circuit. One terminal of an electric storage battery 17sb is connected to the conductor 17g; the other terminal of the battery is connected through an electric contactor 17sc to the blind flange 17b, to which is connected electrically the lower end of the fuel inlet tube 17f which thus acts both as fuel inlet and as a portion of the electric circuit through the heating element. Closing the contactor 17sc completes the circuit and a current of approximately 100 amperes flows through the electric heating element, heating it from a cold condition to red heat in approximately ten seconds. A pipe-tapped hole 17i through the blind flange provides for a pipe connection to drain off excess unvaporized fuel. An air inlet 17h through the wall of the vaporizing chamber 17a near its lower end brings in air for combustion. Above the vaporizing assembly is a pair of spark plugs 17sp in the upper part of the vaporizing chamber 17a. A flame tube 17e of approximately the same diameter as the vaporizing chamber 17a is fitted into the circular opening through the base casting 12, concentric with the chamber 17a, the flame tube extending upward to a level near the upper end of the vapor screen 13e.

The operation of the preheater assembly is initiated by closing the contactor 17sc sending a current through the heating element as just described, heating it to redness in approximately ten seconds; starting the flow of fuel upward through tube 17f, downward through tube 17d, outward radially through the perforations in 17d, outward radially through the slate ring diffuser 17c, seeping through the crevices between the rings and soaking into the porous slate, wetting the outer surface of the slate assembly; the heating element instantly starts vaporization of the film of liquid fuel on the outer surface of the slate diffuser assembly; filling the annular space around the heating element; air flow is started into the vaporizing chamber 17a mixing with the oil vapor; the combustible mixture is carried upward, contacts the spark plugs 17sp and is ignited; the resulting flame, accelerated by the increased temperature and volume of the air, forces the flame upward through the flame tube and beyond, contacting the heat-receiving assembly 13b, from which the heat is rapidly conducted downward through member 13c and 13a to ash ledge 13d, raising their temperature to vaporizing level in approximately one minute. Fuel flow is then started through one of the four nozzles 14 and flow of primary air is started through air inlet 12b into base casting 12, thence upward through annular space surrounding flame tube 17e. Fuel vapor flows through the perforations in screen 13e, mixes with the upward air flow; the combustible mixture is ignited by the flame issuing from flame tube 17e, the resulting flame merging with the first flame from flame tube 17e, contacts the heat-receiving members 13b. After approximately 15 seconds, the preheater is shut down by stopping flow of current through the electric heater, stopping flow of fuel into the preheater. Flow of air through the preheater is continued in order to insure that all residual vapor in the preheater is purged out and burned in the main burner. The spark is stopped after approximately one minute. The flame from the one fuel nozzle 14 of the main burner maintains the vaporizing members at vaporizing temperature.

Figure 13 shows the exterior of a flame-view glass 12fv which provides a view of the flame in the space occupied by the heat-receiving members 13b; the glass is in the form of a thick plug of Pyrex glass adapted to withstand relatively high temperature; secured in a suitable packing gland to prevent leakage of the compressed air. The flame-view glass 12fv provides visible inspection by the operator of the engine and also means for automatic alarm at a remote location and stopping fuel in feed in case of failure of the flame.

The diagram of Figure 1 shows the following parts used only during the starting of the burner and engine from a cold condition:

Check valve 2ab on the right hand end of header 2a; exhaust valve, solenoid operated, 2dx in an extension to header 2d; shaft 4bc adapted to be turned 10 degrees by 4bd to trip toggles 3a and close valve 3 on any cylinder on which valve 3 happened to remain open after the engine was last shut down; a manual push-button starts a starting camshaft which turns one revolution in two minutes, then stops itself having completed the starting cycle; the camshaft carries cams and electric contacts which function in the following sequence:

(1) Starts preheater 17 which delivers a preheating flame into the vaporizing burner 2ca.

(2) At the same time: opens exhaust valve 2dx; starts circulating blower 2b; operates solenoid 4bd closing valves 3 and valve 4bb;

(3) After one minute, starts flow of bunker C fuel oil into burner 13; at the same time: stops preheater; starts engine turning slowly from a storage battery which starts blower 1d driven from engine crankshaft; releases solenoid 4bd, shaft 4bc and toggles 3a leaving valves 3 free for normal operation.

Engine rotation builds up pressure in piping and combustor; check valve 2ab closes automatically by momentary reverse flow. Operator manually controls fuel input gradually raising pressure and speed of engine; battery starting switch opens by reverse current as current reverses in starting motor, leaving engine running on fuel power. When engine is considered sufficiently warm, fuel input is switched over to control by engine speed governor; and engine is ready for load.

Referring to Figures 5 and 9, stationary trip-rod 3b, secured to stationary structure of the cylinder-head on each cylinder, is permanently adjusted to contact and trip toggle 3a at the correct position in relation to rocker 2h and valve 2. When the engine has been shut down and stops turning, valve 3 on some one of the cylinders is left in its open position. When the engine is to be started again from a cold condition, as hereinbefore described, it is necessary to first close the valve 3 which was left in open position. This closing of valve 3 is accomplished by sliding sleeve 4bf to the right, guided on trip rod 3b, thus contacting and tripping toggle 3a and closing valve 3. The sliding of sleeve 4bc is accomplished by its fastening to the bent bar 4be which has a hole near its left end through which crank 4be passes with slack fit, the crank 4be being fastened to shaft 4bc which is rotated about 10 degrees as hereinbefore described.

Figure 2:
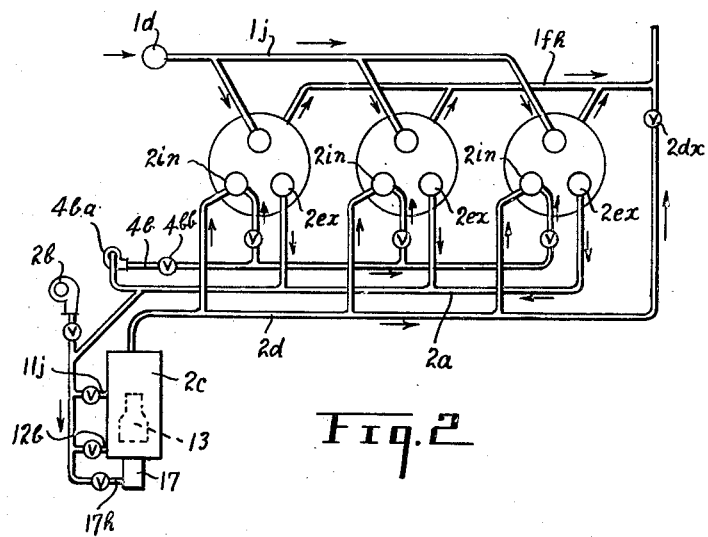
Figure 2 is a schematic diagram similar to Figure 1 but showing an alternative arrangement of valves and piping.

The arrangement of the engine and accessories, as shown in Figure 2 and arrangement shown in Figure 1, have the following features in common:

The inlet of the fresh air, the exhaust of the combustion products and the scavenging of the cylinder, are the same in both arrangements. The external combustor assembly is the same. The purging header 4b and valve 4bb in Figure 1 and operation of valve 4, in Figure 1, are features common to the two arrangements.

The principal differences between Figures 1 and 2 are as follows:

In each cylinder, valve 2 of Figure 1 is replaced by two valves shown in Figure 2, viz: the compressed air outlet valve 2ex; the outlet of compressed air from the cylinder of Figure 2 is the same as in a conventional air compressor, viz: the outlet valve is opened solely by the air pressure in the cylinder in excess of the air pressure on the outer side of the valve disc, the valve being reclosed by the relatively light force of a spring, when the air pressure on the two sides of the valve disc is equalized, which occurs slightly before the piston reaches its top-dead-center position. Then the pressure inside the cylinder drops abruptly to almost zero. The inlet valve 2in of Figure 2 must open outward into a valve chamber, in which the pressure of the combustion products is maintained continuously at the maximum operating pressure in the combustion products header, which is slightly lower than the air pressure on the outer side of the disc of valve 2ex, because of the frictional drop in pressure in the flow of air through the piping to and from the combustor. Valve 2in must not start to open until valve 2ex is completely closed, otherwise at least half of the compressed air pushed out of the cylinder by the piston would pass out through valve 2in and not pass through the combustor. During the time valve 2ex is held open by the excess of air pressure in the cylinder, the same air pressure in the cylinder exerts an opening force on valve 2in, which opening force must be restrained by appropriate means. This restraining force must be released instantly when the piston reaches top-dead-center position and the air pressure in the cylinder drops to zero. Valve 2in must open as quickly as possible against the continuous air pressure from the combustor in the valve chamber. Valve 2in must be held open only a relatively short time, then closed quickly to end the admission period by the time the piston has traveled through a relatively short portion of its power stroke. The opening and closing forces involved are relatively large; for instance, with a valve disc of 2" diameter and a relatively low operating pressure of only 100 p.s.i.g., the force on the valve disc would be 314 lbs. Such a large force would be far greater than could be provided by a practical valve spring. An arrangement of pneumatic cylinders and pistons would be required. Obviously valve 2in of Figure 2 could not be adapted to give as short an admission period as valve 2 of Figure 1 which, at top-dead-center, is already being held in full open position by cam 2f and only requires the force of a relatively light spring 2g to reclose it and end the admission period. A short admission period has the effect of producing a high operating pressure during admission as recorded on an indicator card, and a correspondingly high engine efficiency. Conversely, lengthening the admission period has the opposite effect.

What I claim is:

1. A continuous external combustion engine having cylinders, pistons in said cylinders, means for operating said pistons to compress air in said cylinders, a combustor external to said cylinders, a fuel burner in said combustor, adapted to burn liquid fuel containing solid constituents, said burner having means for separating said solid constituents from said fuel, means for passing said compressed air through said burner and combustor, means for vaporizing said liquid fuel, means for mixing said vaporized fuel with said compressed air, means for igniting and burning said combustible mixture, means for passing said combustion products into said cylinders to drive said pistons in their power strokes, means for excluding said separated solid constituents from said combustion products and said cylinders.

2. A continuous external combustion engine according to claim 1, in which the said burner includes means for continuously removing said solid constituents from said burner.

3. A continuous external combustion engine as set forth in claim 2 having means for ejecting the solid constituents from said combustor.

4. A continuous external combustion engine as set forth in claim 1, in which the said burner comprises a metallic vaporizing member of cylindrical shape, a cylindrical perforated screen concentric with said vaporizing member, a plurality of fuel-spray nozzles adapted to distribute fuel oil on the inner surface of the vaporizing member and a fuel delivery tube to each of said fuel-spray nozzles, the said fuel delivery tubes being enclosed within a tubular assembly and means for controlling the temperature and viscosity of the liquid fuel in said fuel delivery tube.

5. A continuous external combustion engine as set forth in claim 4, in which the said burner includes means for initially preheating the vaporizing member, said means comprising a metallic heat-transfer member joined to said vaporizing member, and an auxiliary fuel oil burner having a flame tube directing a flame from the auxiliary fuel oil burner into contact with said heat-transfer member.

6. A continuous external combustion engine as set forth in claim 5, in which the said auxiliary burner includes fuel vaporizing means comprising a fuel diffuser, an electric heating element, an air inlet and means to ignite the combustible mixture of fuel vapor and air.

7. A continuous external combustion engine having cylinders, cylinder-heads, interconnected pistons in said cylinders, air inlet valves adapted to admit air into said cylinders, means for driving said pistons to compress the air admitted to said cylinders, valve chambers in said cylinder-heads, reverse flow valves in said valve chambers, said reverse flow valves being adapted to pass the air compressed by said pistons out of said cylinders, a combustor external to said cylinders and cylinder-heads, a liquid fuel burner in said combustor, air inlets to said combustor and fuel burner, conduit means between said valve-chambers in said cylinder-heads and said combustor, adapted to conduct compressed air from said cylinders to said combustor, second conduit means adapted to carry the products of combustion from said combustor to said valve-chambers and through said reverse-flow valves into said cylinders to drive said pistons in their power strokes, exhaust valves adapted to pass the combustion products out of said cylinders at the completion of the power strokes of said pistons, means operating said valves in synchronism with said pistons, blower means for circulating said compressed air from said cylinders through said conduit means and combustor and returning said compressed air with combustion products to said cylinders to drive said pistons in their power strokes, and means for providing to said burner, compressed air of adequate purity for efficient combustion in said external combustor.

8. A continuous external combustion engine according to claim 7, in which means are provided to adequately exclude combustion products from the compressed air entering the said external burner.

9. A continuous external combustion engine according to claim 7, in which valve means prevent the flow of combustion products from the said combustor through the said valve chambers into the compressed air conduits conveying compressed air to the said external burner.

10. A continuous external combustion engine according to claim 8, in which valve means permit removal of combustion products from said valve chambers, after the cessation of flow of combustion products through said valve chambers into said cylinders.

11. A continuous external combustion engine according to claim 10, in which the said last named valve means are adapted to direct the flow of combustion products from said valve chambers into the aforesaid conduit means which convey the combustion products from said external combustor to said valve chambers.

12. A continuous external combustion engine according to claim 7 in which said reverse flow valve in each of said valve chambers has pneumatic reclosing means adapted to counter-balance the pneumatic thrust opposing the reclosing of said valve.

13. A continuous external combustion engine as set forth in claim 7, in which the said valve chambers, combustor and combustion products conduit means are provided with internal heat insulation, enclosed by containers of sheet metal, said enclosed insulation having adequate thermal and mechanical characteristics.

14. A continuous external combustion engine as set forth in claim 7 in which means for starting the said engine and its auxiliaries from a cold condition comprise means for manually initiating the functioning of said starting means, and automatic means for continuing the operation of said starting means until the said engine and its auxiliaries are thereby put in readiness to carry load, the said starting means comprising automatic means for preheating said combustor and conduit means, initiating rotation of said engine, preheating said engine, and operating the elements of said starting means in correct sequence.

References Cited in the file of this patent

UNITED STATES PATENTS

| | | |
|---|---|---|
| 811,809 | Williams | Feb. 6, 1906 |
| 1,235,145 | Kylliainen | July 31, 1917 |
| 1,849,347 | Dale | Mar. 15, 1932 |
| 2,248,639 | Miksits | July 8, 1941 |
| 2,593,849 | Clarke et al. | Apr. 22, 1952 |
| 2,669,839 | Saboe | Feb. 23, 1954 |

FOREIGN PATENTS

| | | |
|---|---|---|
| 672,255 | Canada | Apr. 23, 1957 |
| 675,693 | France | Nov. 8, 1929 |